G. MACLOSKIE.
FLUID PRESSURE BRAKE.
APPLICATION FILED MAY 10, 1917.

1,289,847.

Patented Dec. 31, 1918.

Inventor
George Macloskie
by Albert E. Davis
His Attorney.

UNITED STATES PATENT OFFICE.

GEORGE MACLOSKIE, OF ERIE, PENNSYLVANIA, ASSIGNOR TO GENERAL ELECTRIC COMPANY, A CORPORATION OF NEW YORK.

FLUID-PRESSURE BRAKE.

1,289,847.  Specification of Letters Patent.  Patented Dec. 31, 1918.

Application filed May 10, 1917. Serial No. 167,675.

*To all whom it may concern:*

Be it known that I, GEORGE MACLOSKIE, a citizen of the United States, residing at Erie, county of Erie, State of Pennsylvania, have invented certain new and useful Improvements in Fluid-Pressure Brakes, of which the following is a specification.

My invention relates to a fluid pressure brake system and more particularly to such a system in which a supplemental reservoir is used. Such a reservoir has hitherto been used for the purpose of effecting a graduated release of the brakes in a manner well understood in the art, and it has been customary to charge this reservoir from the brake pipe. This, however, introduces some disadvantageous features such as, for example, a time interval between the successive applications in order fully to charge the supplemental reservoir which cannot be afforded under certain conditions of operation and particularly in the case of trains that are run at high speed and with frequent stops.

In accordance with my invention, the supplemental reservoir, whether used for effecting graduated release or other purposes, is charged from any convenient source, preferably from the main reservoir either directly or through a control pipe, thereby greatly reducing the time required to charge the supplemental reservoir, and in general facilitating the operation of the brakes.

Figure 1:
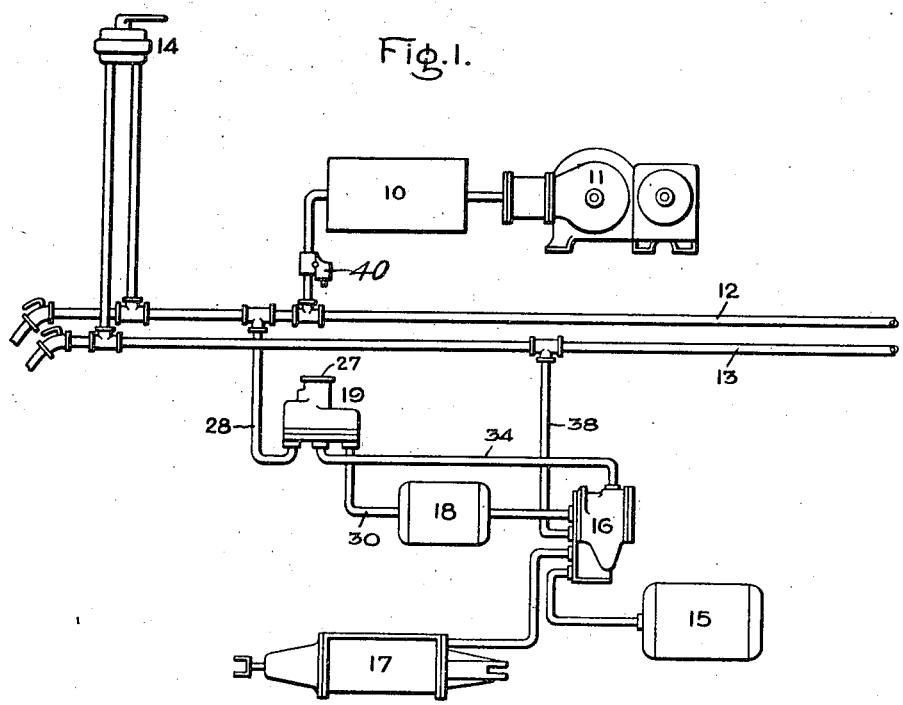
Figure 2:
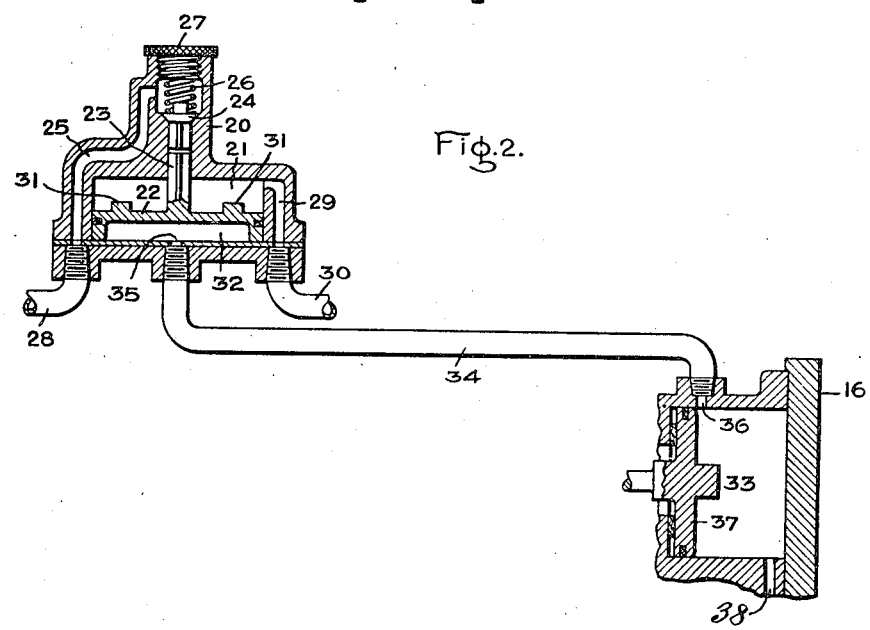

My invention will best be understood by reference to the accompanying drawing in which Figure 1 is a diagrammatic view of an automatic fluid pressure brake system embodying my invention, and Fig. 2 is a detailed view showing in section a portion of the triple valve and the supplemental valve device embodied in my invention connected thereto.

Referring now to the drawings, 10 is the main reservoir which is charged by an air compressor 11 in the usual manner. The main reservoir communicates with the main reservoir pipe 12 through a reducing valve 40. The pipe 12 communicates with the train pipe 13 through the engineer's valve 14 and the auxiliary reservoir 15 communicates with the train pipe and charges the brake cylinder 17 in the usual manner which is well understood.

My invention is particularly useful in a system in which a supplemental reservoir is used for effecting a graduated release of the brakes. This reservoir, which I have indicated by the numeral 18, in such a case communicates with the valve chamber of the triple valve 16, as well understood.

I have indicated the valve mechanism through which the supplemental reservoir is charged from the main reservoir and which constitutes a part of my invention, by the reference numeral 19. This valve mechanism comprises a valve casing 20 provided with a chamber 21 within which is seated a piston 22 provided with a stem 23 received in an opening in the valve casing. A passage 25 in the valve casing communicates with the main reservoir pipe through a pipe 28, and a passage 29 in the valve casing 20 communicates with the chamber 21, and by means of the pipe 30 with the supplemental reservoir. Communication between the main reservoir and the supplemental reservoir through the passages 25 and 29 is controlled by a valve 24. This valve is normally closed by a spring 26, the upper end of which engages a removable cap 27. The piston 22 is provided on its back with lugs 31 which engage the wall of the casing and prevent the piston from closing the chamber 21 back of the piston and thereby cutting off communication between the ports 25 and 29 when the piston 22 is operated. The chamber 32 beneath the piston 22 communicates with the main piston chamber 33 of the triple valve through a pipe 34, connected by ports 35 and 36 in the casings of the valve 19 and the triple valve respectively. The piston chamber 33 back of the piston 37 of the triple valve is connected by a pipe 38 to the train pipe 13 in the usual manner.

The operation of that portion of the system shown embodying my invention will be readily understood from the above description and is as follows: When the brakes are released, train pipe pressure is admitted to the piston chamber 33 of the triple valve in a well known manner and moves the piston 37 to the release position shown in Fig. 2. At this time the port 36 is uncovered and train pipe pressure is admitted to the chamber 32 and if the supplemental reservoir pressure is less than the train pipe pressure, moves the piston 22 upwardly and the stem thereof opens the valve 24, thereby opening communication between the main reservoir and the supplemental reservoir, thus causing a rapid recharge of the supplemental reservoir through passages 25 and 29.

In systems in which the supplemental reservoir is recharged from the brake pipe through the triple valve, the rate at which the supplemental reservoir is recharged is controlled by the size of the port around the triple valve piston. This port must be limited in size in order not to interfere with the operation of the triple valve. The passages 25 and 29 of the valve 19 are not so limited in size and, therefore, it is obvious that the recharge of the supplemental reservoir is more rapid through the valve device 19 than it is in other systems through the triple valve.

While I have described my invention as embodying a concrete structure and as operating in a specific manner, in accordance with the requirements of the patent statutes, it should be understood that my invention is not limited thereto, since various modifications thereof will suggest themselves to those skilled in the art without departing from the spirit of my invention, the scope of which is set forth in the annexed claims.

What I claim as new and desire to secure by Letters Patent of the United States, is,—

1. In an air brake system, the combination with a source of pressure, a train pipe, an auxiliary reservoir and a brake cylinder, of a supplemental reservoir for effecting the variable release of the brakes, and means responsive to a difference of pressure in the train pipe and in the supplemental reservoir for charging said supplemental reservoir from the main reservoir.

2. In an air brake system, the combination with a main reservoir, a train pipe, an auxiliary reservoir and a brake cylinder, of a supplemental reservoir for effecting the variable release of the brakes, and means responsive to the train pipe pressure for charging said supplemental reservoir from the main reservoir.

3. In an air brake system, the combination with a main reservoir, a train pipe, an auxiliary reservoir and a brake cylinder, of a supplemental reservoir for effecting the variable release of the brakes, and a valve device operated in response to the train pipe pressure for charging the supplemental reservoir from the main reservoir.

4. In an air brake system, the combination with a main reservoir, a train pipe, an auxiliary reservoir and a brake cylinder, a supplemental reservoir for effecting the variable release of the brakes, a piston operated in response to train pipe pressure, and a valve coöperating with said piston and operated in response to the movement thereof, for connecting said supplemental reservoir with the main reservoir.

5. In an air brake system, the combination with a source of pressure, a train pipe, an auxiliary reservoir and a brake cylinder, of a suplemental reservoir for effecting the variable release of the brakes, and means responsive to a pressure in the train pipe which exceeds the supplemental reservoir pressure for charging said supplemental reservoir from the main reservoir.

In witness whereof, I have hereunto set my hand this 8th day of May, 1917.

GEORGE MACLOSKIE.

Copies of this patent may be obtained for five cents each, by addressing the "Commissioner of Patents, Washington, D. C."